United States Patent [19]

Okabe

[11] Patent Number: 5,506,461
[45] Date of Patent: Apr. 9, 1996

[54] BRUSH ASSEMBLY STRUCTURE FOR MOTOR

[75] Inventor: Hiroji Okabe, Gunma, Japan

[73] Assignee: Mitsuba Electric Manufacturing Co., Ltd., Gunma, Japan

[21] Appl. No.: 205,743

[22] Filed: Mar. 4, 1994

[30] Foreign Application Priority Data

Mar. 5, 1993 [JP] Japan ................. 5-015068 U

[51] Int. Cl.⁶ ........................................... H01R 39/38
[52] U.S. Cl. ..................... 310/239; 310/242; 310/245; 310/246
[58] Field of Search ............................... 310/239, 242, 310/245, 246

[56] References Cited

U.S. PATENT DOCUMENTS

| 4,593,220 | 6/1986 | Cousins et al. | 310/239 |
| 4,638,204 | 1/1987 | Kirchner et al. | 310/239 |

FOREIGN PATENT DOCUMENTS

| 175993 | 4/1986 | European Pat. Off. |
| 58-166262 | 8/1983 | Japan . |
| 58-115862 | 8/1983 | Japan . |
| 2189943 | 11/1987 | United Kingdom . |

Primary Examiner—Steven L. Stephan
Assistant Examiner—Elvin G. Enad
Attorney, Agent, or Firm—Oliff & Berridge

[57] ABSTRACT

A brush assembly structure for a motor has a brush holder integrally formed in substantially a C-shape so that free ends of leg portions of the brush holder are positioned at diametrically opposed side positions of a commutator. Brush accommodation units are formed at the free ends of the leg portions. Brush springs are attached to the cylindrical bottom portion of a holder stay unit. The brush springs elastically depress brushes accommodated in the brush accommodation units at the moment when the brushes reach the diametrical side positions of the commutator. When the brush unit is assembled to the holder stay unit in accordance with the invention, the brushes are protected during assembly and an assembly job is simplified.

11 Claims, 9 Drawing Sheets

BRUSH ASSEMBLY STRUCTURE FOR MOTOR

FIELD OF THE INVENTION

This relates to a brush assembly structure for a motor and, more particularly, a motor for automotive electric parts.

BACKGROUND OF THE INVENTION

In general, brushes for a motor are mounted so that they come into elastically sliding contact with a sliding surface of a commutator connected to an armature shaft. As a result, when the commutator is absent, the brushes project inwardly beyond the sliding surface of the absent commutator. To overcome this problem, a method is used where each brush is temporarily held against a spring at a position spaced apart from a commutator during assembly of an armature and then the temporarily held brush is released. In this case, however, the task of holding and releasing each brush is time-consuming and troublesome and presents the possibility of sometimes forgetting to perform this task.

Consequently, as disclosed in Japanese Utility Model Unexamined Publication No. Sho 58-115862 and Japanese Utility Model Unexamined Publication No. Sho 58-166262, a method is disclosed in which a brush unit has brushes preset in a brush holder. An opening is formed in a holder stay unit, in which the brush unit is to be mounted and then the brush unit is inserted in the opening of the holder stay unit after an armature has been preassembled. In the method in Publication No. Sho 58-115862, however, a brush unit must be formed for each brush and each brush unit having a brush must be engaged and assembled. Accordingly, since as many brush units are needed as there are brushes, the number of parts is increased and production output is lowered. Further, since the brush is biased to significantly project from the brush unit by a spring assembled in the brush unit, a problem arises in that the brush is in contact with other parts and is liable to be damaged by the other parts before the brush unit is completely assembled to the holder stay unit.

On the other hand, in Publication No. Sho 58-166262, since a pair of brushes are assembled in a brush unit, there is an advantage that the number of brush units can be reduced to half those in Publication No. Sho 58-115862. In this case, however, since a brush accommodation unit is not used, each brush is biased and held from significantly projecting by the use of a leaf spring fixed to a brush holder. Thus, the brush is not stably held by a brush accommodation unit. Further, a guide receiving portion is formed at the extreme end of the leaf spring to guide the brushes into sliding contact with a commutator in such a manner that the guide receiving portion is in contact with the periphery of the commutator and to increase the distance between the confronting brushes. Consequently, the possibility of the surface of the commutator being scratched by the guide receiving unit arises.

SUMMARY OF THE INVENTION

Accordingly, it is a primary object of the invention to provide a brush assembly that has a reduced number of parts and processes for assembly and where brushes are accommodated to be protected during assembly.

Another object of the invention is to provide a brush unit where the brush is stably held by a brush accommodation unit.

Another object of the invention is to provide a spring to guide the brushes into sliding contact that avoids contacting or scratching the surface of the commutator.

Another object of the invention is to provide a spring of the type that does not produce noise when vibration produced by the rotation of the commutator is transmitted to the spring through the brushes.

Another object of the invention is to provide an assembly that significantly simplifies an automatic assembly line assembly of a motor.

Another object of the invention is to produce a brush holder that accommodates brushes that are not biased by springs during part of an assembly and therefore are not significantly projected during part of the assembly.

Another object of the invention is to provide an assembly where the brushes are biased by action of springs on a holder stay unit at the moment when the brush reaches a predetermined position.

The foregoing objects are attained by the invention, which pertains to a brush assembly structure provided for a motor. The motor has a pair of brushes which are accommodated in brush accommodation units formed on a brush holder so that the brushes can project from and retract into the brush accommodation units. The brushes come into elastically sliding contact with diametrically opposed side positions of a commutator. Preferably, the diametrically opposed side positions are located along a horizontal axis of the commutator. The brush holder is integrally formed in substantially a C-shape so that the free ends of the leg portions, more particularly, brush accommodation units formed on the free ends, of the brush holder confront the diametrically opposed side positions of the commutator. Support portions are provided in a holder stay unit for supporting springs, which elastically depress the brushes. Passing-through holes are formed in the holder stay unit. Leg portion of the brush holder are inserted into the passing-through holes. The brush holder is positioned so that the brush accommodation units confront the diametrically opposed side positions of the commutator. The springs are disposed at positions in the holder stay unit such that the springs elastically depress the brushes accommodated in the brush accommodation units at the moment when the brush accommodation units reach the diametrically opposed side positions of the commutator.

Accordingly, in accordance with the invention, a pair of the brushes are movably accommodated in a retracted or insignificantly projected position in the brush accommodation units formed on the brush holder and the brush holder and brushes are assembled as a unit to the holder stay unit. Therefore, the brushes can be protected and an assembly job can be simplified.

BRIEF DESCRIPTION OF THE DRAWINGS

Referring now to the drawings which form a part of this original disclosure.

DETAILED DESCRIPTION OF PREFERRED EMBODIMENTS

An embodiment of the invention will be described with reference to the drawings. A motor 1 has a speed reduction mechanism serving as a power source for automotive electric parts. The motor 1 has a casing 2 including a cylindrical yoke 3 with a bottom and an end case 4 assembled to the open end of the yoke 3. Although the yoke 3 has various parts such as, for example, a permanent magnet 5, an armature shaft 6 and an armature core 7 and the end case 4 has the speed reduction mechanism such as, for example, a worm gear 6a formed at the extreme end of the armature shaft 6 and a worm wheel (not shown) to be meshed with the worm gear 6a, the basic arrangement of these parts is similar to related art assemblies.

Figure 3:
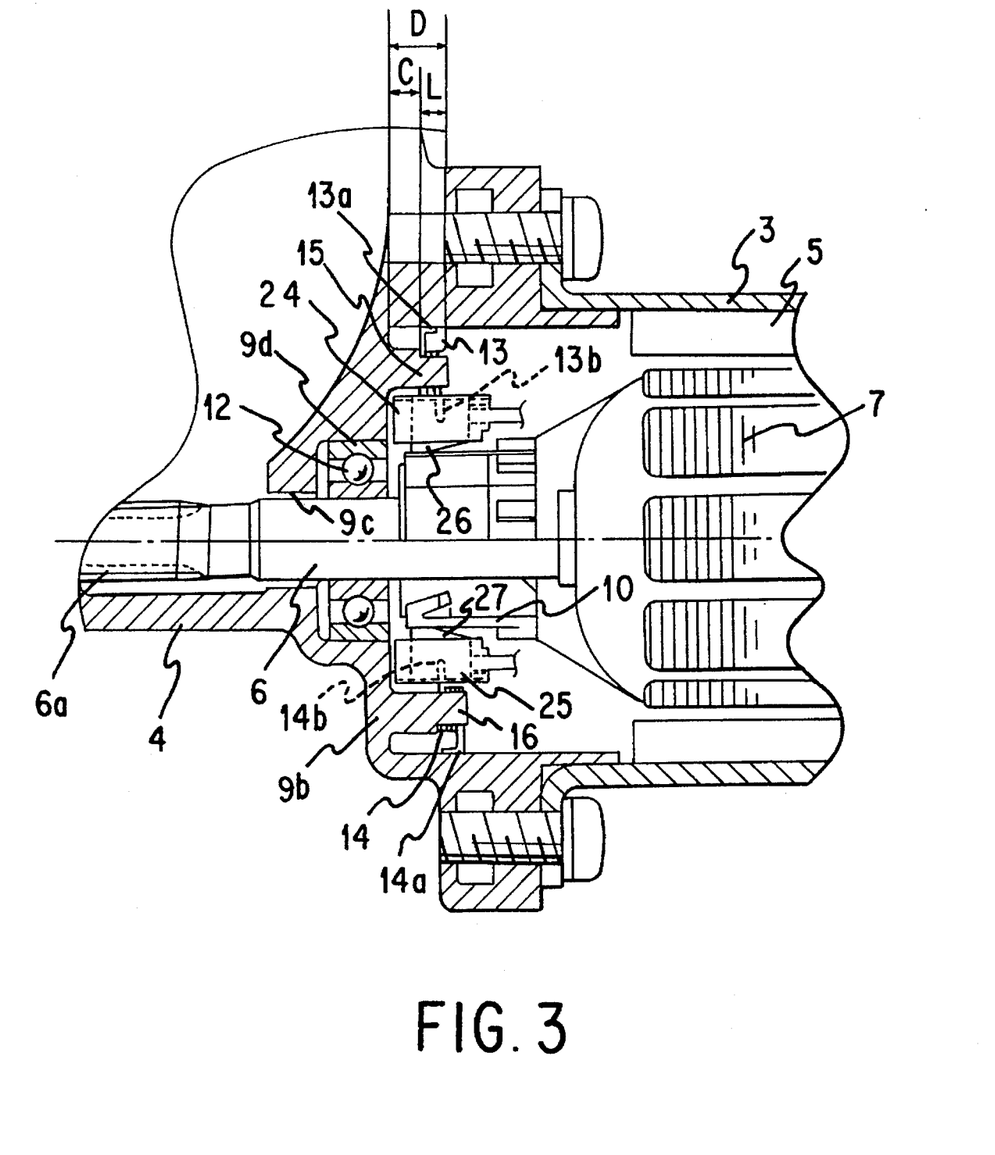
FIG. 3 is a cross-sectional view of the holder stay unit in FIG. 2.
Figure 4:
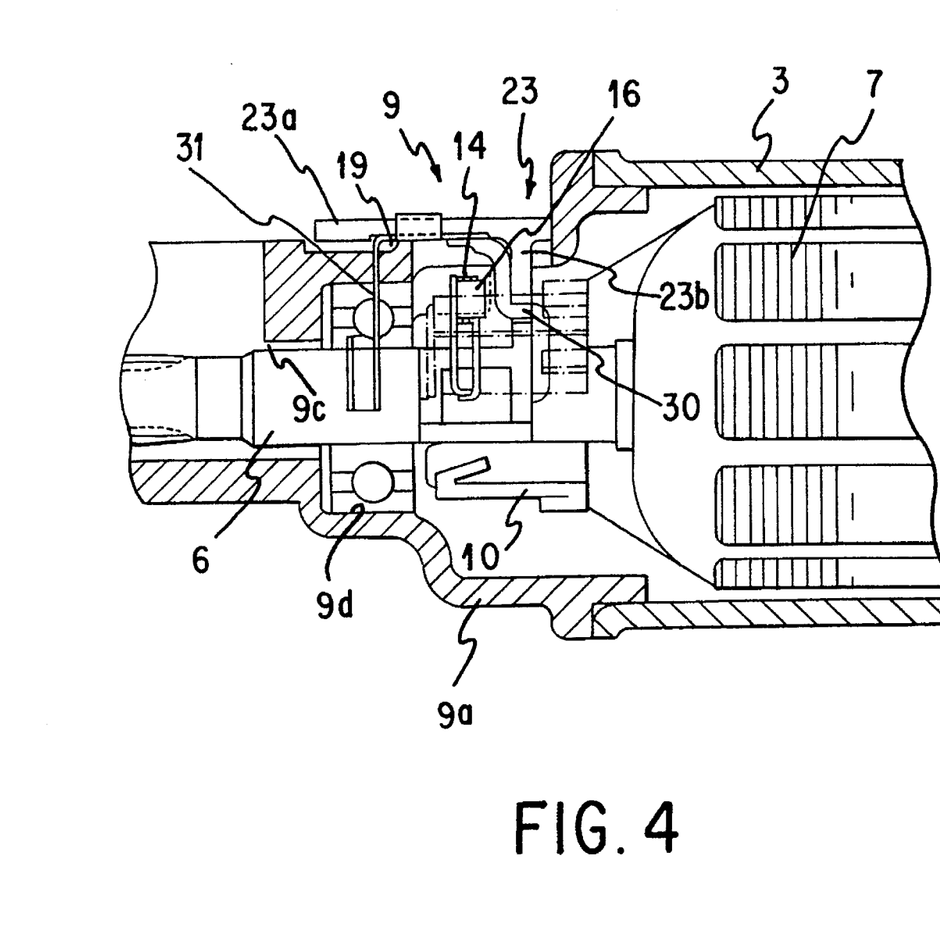
FIG. 4 is a vertical cross-sectional view along A—A of the holder stay unit in FIG. 1.
Figure 5:
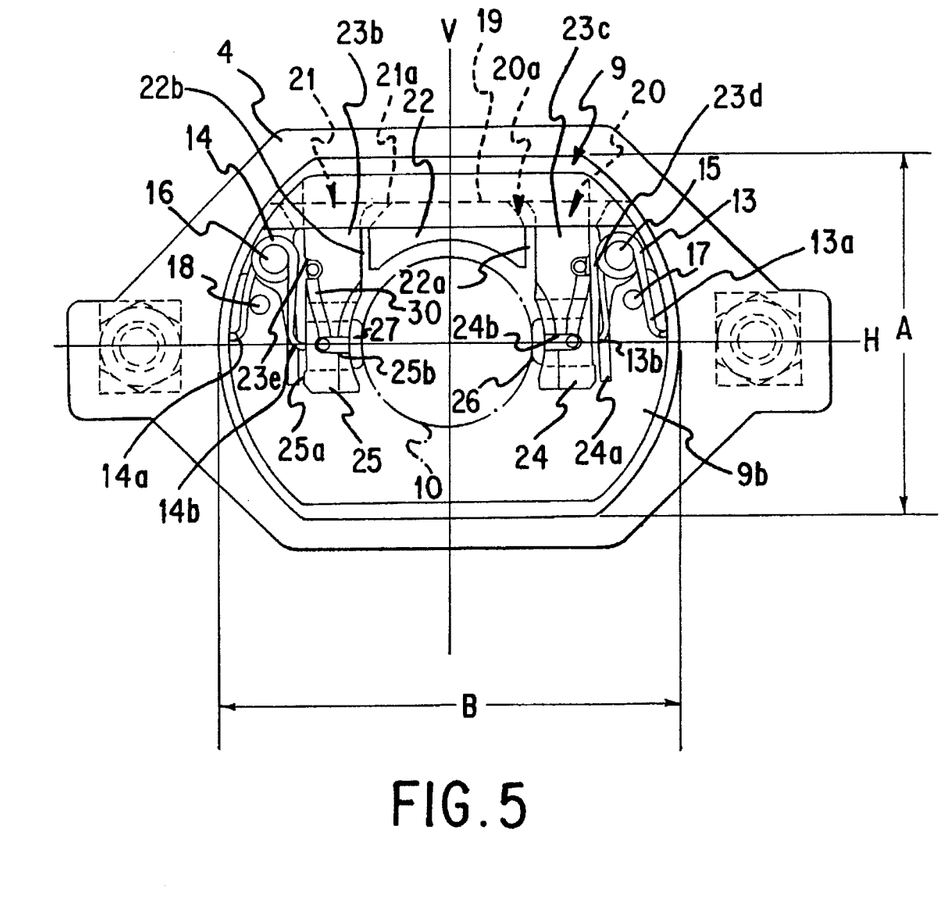
FIG. 5 is a cross-sectional view along B—B of the holder stay unit in FIG. 1.

In the above casing 2, the yoke side end of the end case 4 is formed to a holder stay unit 9 to which a brush unit, to be described later, is assembled. More specifically, the holder stay unit 9 has a cylindrical shape with a bottom, as seen in FIG. 3, and a commutator 10 integrally formed with the armature shaft 6 is disposed in a cylindrical portion 9a of the holder stay unit 9. As seen in FIG. 5, the holder stay unit 9 has a width B in a horizontal line H direction which is longer than a width A in a vertical line V direction which is perpendicular to the horizontal line H at a shaft center of the armature shaft 6 (A<B). In general, the horizontal line H is along a transverse axis in the same plane as the longitudinal axis of the armature shaft, and the vertical line V is an orthogonal axis perpendicular to the longitudinal and traverse axes thereby forming three orthogonal axes. As seen in FIG. 3, an inserting hole 9c through which the worm gear 6a is inserted is formed at the center of the cylindrical bottom portion 9b of the holder stay unit 9. In general, the portion 9b can be of any orientation such as an end or side portion. An engaging groove 9d is formed in the peripheral edge of the inserting hole 9c for housing a bearing 12, which rotatably supports the armature shaft 6. Further, first and second spring support portions 15, 16 and first and second locking portions 17, 18 project from an inner surface, for example, an inner cylindrical surface, of the cylindrical bottom portion 9b. Coil portions 13c, 14c of first and second twisted coil type brush springs 13, 14 are inserted through and supported by the spring support portions 15, 16. Ends 13a, 14a of the brush springs 13, 14 are locked to the locking portions 17, 18, respectively. As shown in the embodiment shown in FIG. 5, the above described parts are disposed substantially on one side of, in particular, a side above, the horizontal line H. In addition, the spring support portions 15, 16 are disposed symmetrically with respect to the vertical line V and the locking portions 17, 18 are disposed symmetrically with respect to the vertical line V. Further, the locking portions 17, 18 are disposed closer to the horizontal line H than the spring support portions 15, 16. In addition, ends 13a, 13b, 14a, 14b of the brush springs 13, 14 are substantially linearly extended and an extended extreme end, for example, a free end, of each of the ends 13a, 13b, 14a, 14b is expanded and curved.

Figure 8:
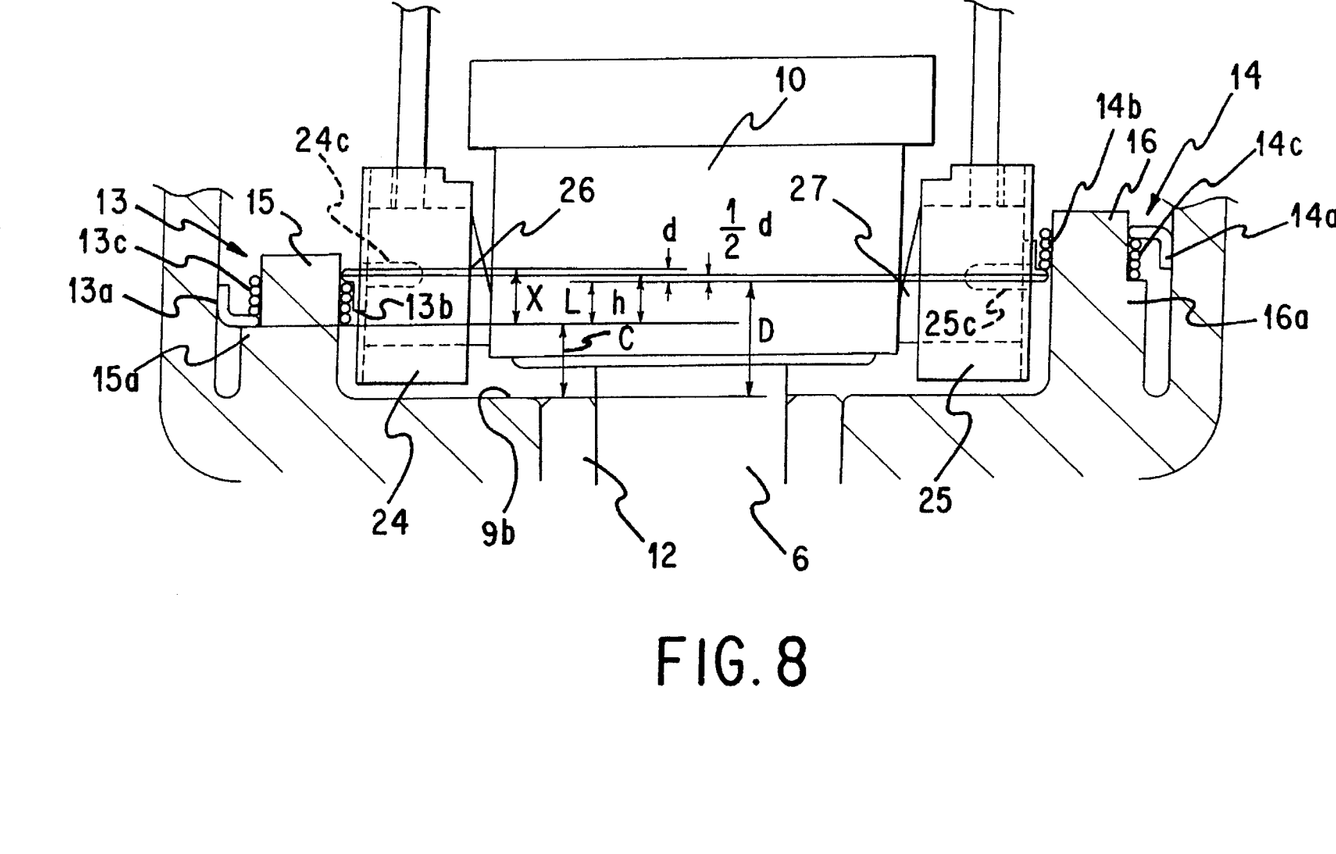
FIG. 8 shows part of FIG. 3 in greater detail.
Figure 9:
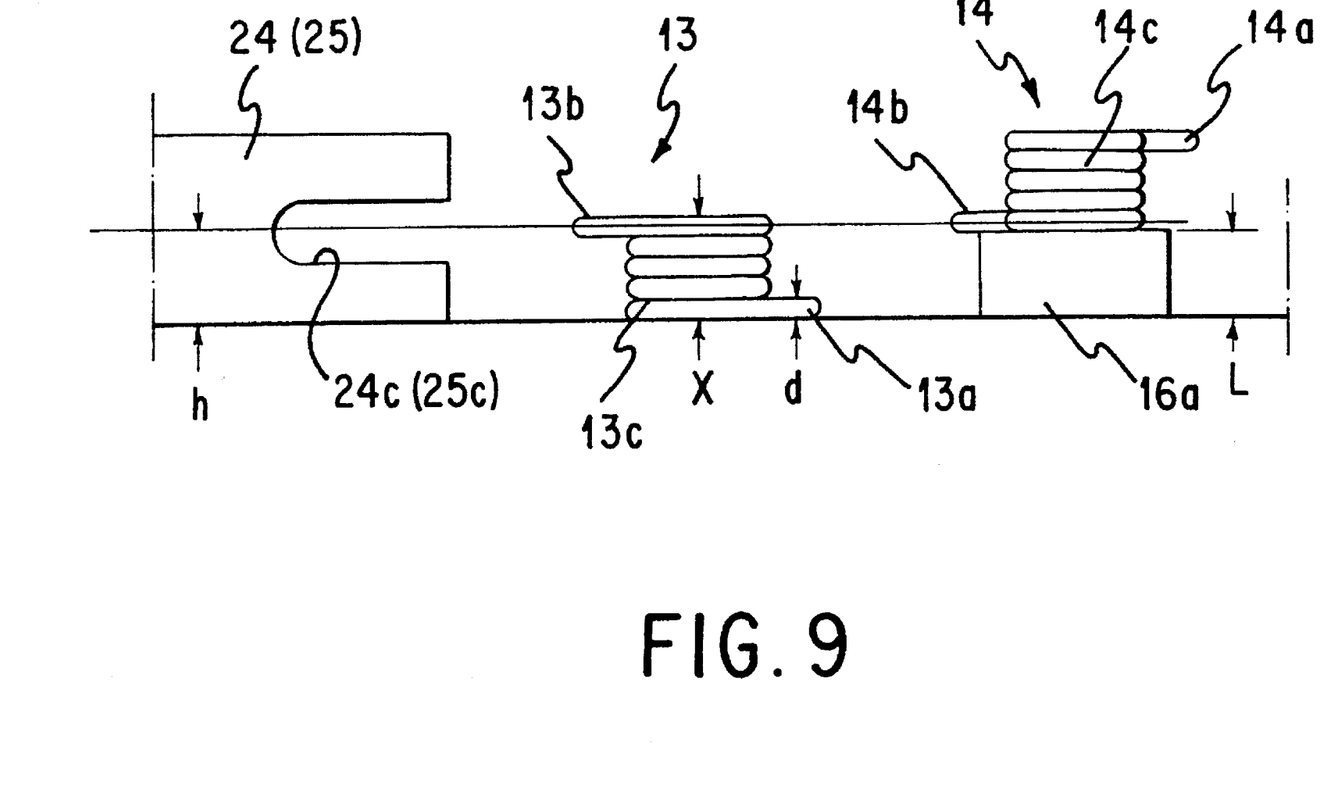
FIG. 9 is a side view of FIG. 8.

Moreover, when coil portions 13c, 14c of the brush springs 13, 14 are passed through and supported by the spring support portions 15, 16 and the ends 13a, 14a of the brush springs 13, 14 are held between the locking portions 17, 18 and the inner periphery of the cylindrical portion 9a and locked, the springs 13, 14 are disposed so that the other ends 13b, 14b of the springs 13, 14 project in an inner first and second direction in a natural state and are located at the paths into which the leg portions 23b, 23c of a brush holder, to be described later, are inserted. Distances, for example, heights of seat portions 15a, 16a on the spring support portions 15, 16 are set as follows. As shown in FIGS. 3 and 8, a height C of a position where the brush 13 is mounted is different by a value substantially corresponding to a dimension, for example, a length X of the brush springs 13, 14 from a distance, for example, a height D of the position where the brush spring 14 is mounted (D≒C+X). This embodiment is shown in greater detail in FIGS. 8 and 9. In particular, the seat portion 15a of the spring support portion 15 is positioned at the height C from the cylindrical bottom portion 9b. The seat portion 16a of the spring support portion 16 is positioned at a distance D, for example, a height D from the cylindrical bottom portion 9b. Accordingly, height difference L is the height difference between the seat portion 15a and the seat portion 16a (L=D−C). When a diameter of the coil is d, the height difference L is set such that the length X of the brush spring minus the diameter d of the coil is determined by the following formula:

$$L = X - d.$$

Furthermore, when a distance between the seat portion 15a and a position on the brush 26 where the brush 26 is pressed by the brush spring is a distance h, the height difference L is determined by the following formula:

$$L = h - (\tfrac{1}{2}) \times d.$$

As a result, when the springs 13, 14 which are twisted in a same direction are mounted so that they are reversed in the first and second directions, the other ends 13b, 14b of the springs project at substantially the same lengths, and thus the brush springs 13, 14 can be used on the first and second sides.

Further, as seen in FIG. 5 the holder stay unit 9 has a recessed portion 19 in an outside upper periphery of the cylindrical portion 9a thereof with respect to the horizontal line H. Passing-through holes 20, 21, into which leg portions 23b, 23c of a brush holder to be described later are inserted from an outside, are formed at first and second positions of the recessed portion 19. The passing-through holes 20, 21 are symmetrically disposed with respect to the traverse axis or the vertical line V, as seen in FIG. 5, inwardly of the spring support portions 15, 16, for example, closer to the transverse axis than the spring support portions 15, 16, and outwardly of the commutator 10. Further, although the passing-through holes 20, 21 have a substantially square shape, peripheral edges of the passing-through holes 20, 21 have taper-shaped portions 20a, 21a each gradually narrowing from a wide outside portion to a narrow inside portion. Further, a guide member 22 projecting in a direction toward the commutator 10 is integral with an inner periphery of the recessed portion 19 between the passing-through holes 20, 21. Guide surfaces 22a, 22b on the first and second sides of the guide member 22 extend from the taper-shaped portions 20a, 21a of the passing-through holes to positions in a vicinity of diametrically opposed sides of the commutator 10.

In addition, a brush holder 23 is integrally formed in substantially a C-shape by a mounting plate 23a, the leg portions 23b, 23c, and quadrangular-prism-shaped brush accommodation units 24, 25 formed at free ends of the leg portions 23b, 23c. The quadrangular-prism-shaped brush accommodation units 24, 25 each have open opposing ends. Brushes 26, 27 are accommodated in the quadrangular-prism-shaped brush in such a manner that brushes 26, 27 can emerge from and retract into the brush accommodation units by way of the open opposing ends. The brush holder 23, which is arranged as a unit and has the brushes 26, 27 accommodated in the brush accommodation units of the brush holder 23, is mounted on the holder stay unit 9. In the holder stay unit 9, an armature assembly including, for example, the armature shaft 6, the armature core 7 and the commutator 10 is preassembled, and passes through the mounting structure. More specifically, when the brush holder 23 is to be mounted, the brush springs 13, 14 are presupported by the spring support portions 15, 16 and the ends 13a, 14a of the brush springs 13, 14 are locked by the locking portions 17, 18. In this state, the leg portions 23b, 23c of the brush holder are inserted into the passing-through holes 20, 21. At this time, the other ends 13b, 14b of the springs are located at the inserting paths as described above, and as shown in FIG. 7. When the leg portions 23b, 23c are gradually inserted, projections 24a, 25a formed on outside corners on the first and second sides of the free ends of the brush accommodation units 24, 25 abut against the other ends 13b, 14b of the springs and depress them against the direction in which the brush springs 13, 14 are biased.

Figure 7:
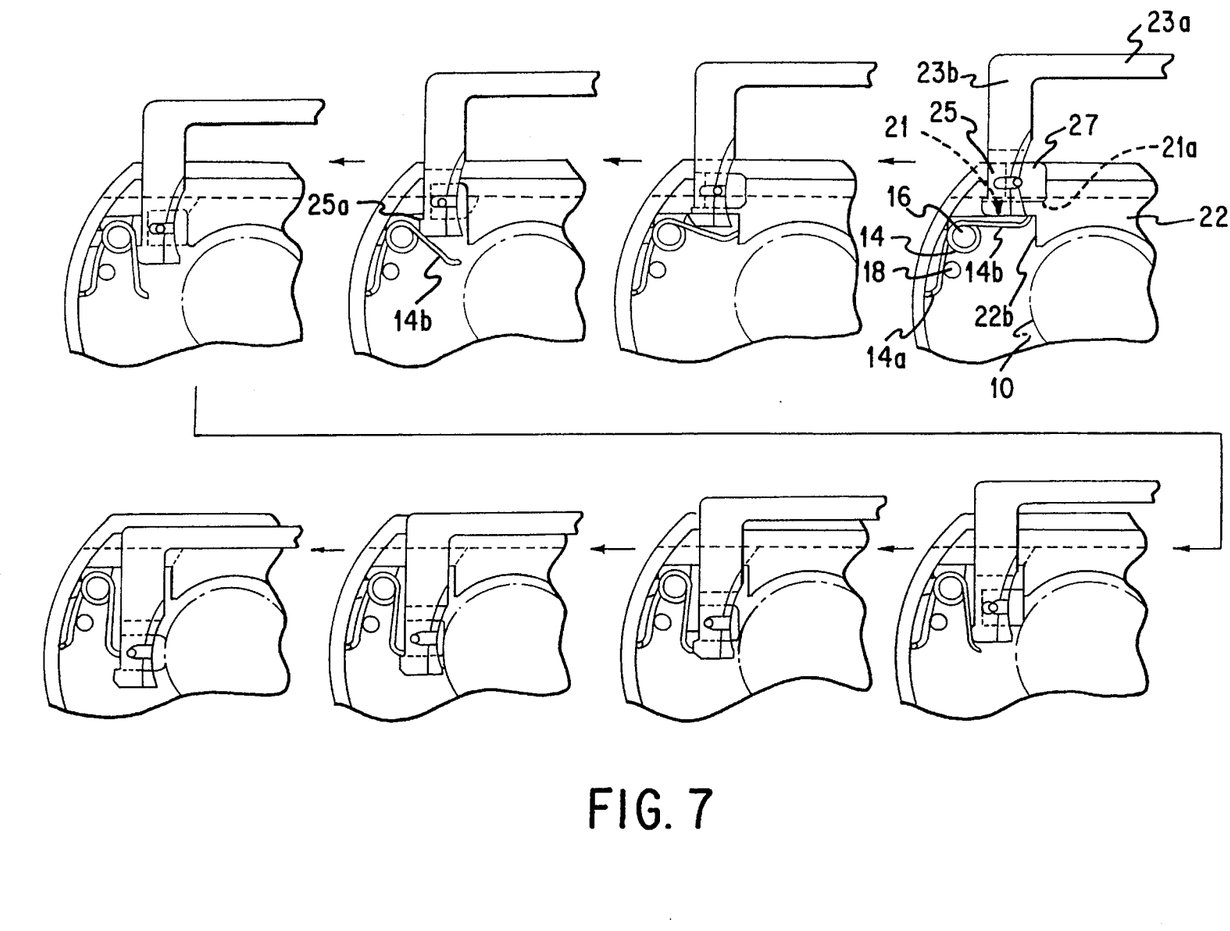
FIG. 7 is a diagram of steps for assembling a brush unit to the holder stay unit.

The brushes 26, 27 accommodated in the brush accommodation units 24, 25 are guided during insertion by the guide surfaces 22a, 22b of the guide member 22 until free ends of the brush holder, for example, the brush accommodation units, come into contact with the commutator 10 and then the brushes are guided by the commutator 10. When the brushes 26, 27 reach first and second diametrically opposed side positions of the commutator 10, the other ends 13b, 14b of the springs are released from the projections 24a, 25a of the brush accommodation units and abut against outside surfaces of the brushes 26, 27 in a diametrical direction of the commutator to elastically urge the brushes 26, 27 toward the commutator 10. Further, when the brushes 26, 27 reach the first and second diametrical side positions of the commutator 10, the mounting plate 23a abuts against an outside periphery of the recessed portion 19 to regulate further insertion of the leg portions 23b, 23c. The mounting plate 23a can be fixed to the recessed portion 19 by a screw 28 so that the brush holder 23 can be integrally mounted on the holder stay unit 9.

Figure 1:
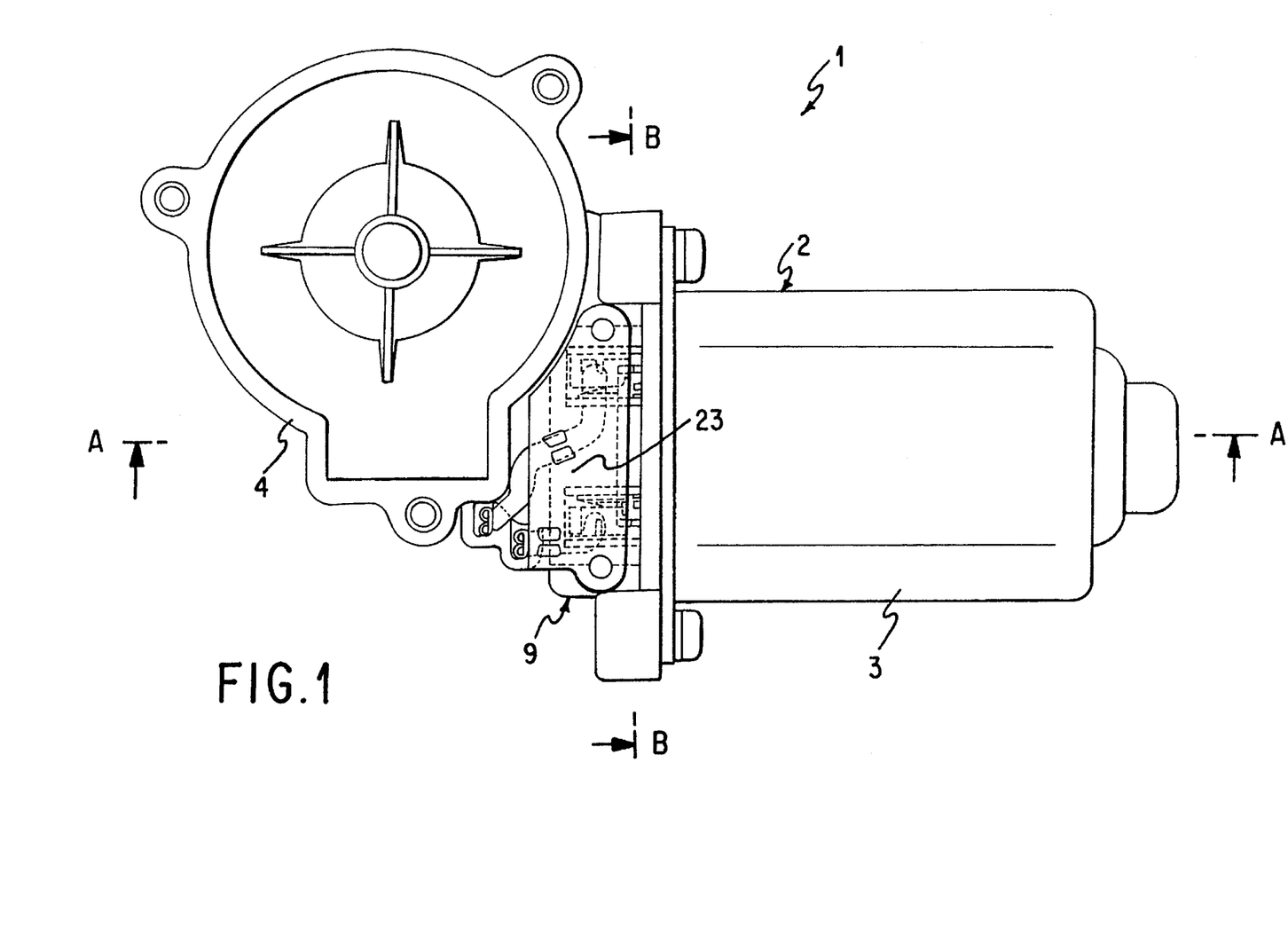
FIG. 1 is a plan view of a motor.
Figure 2:
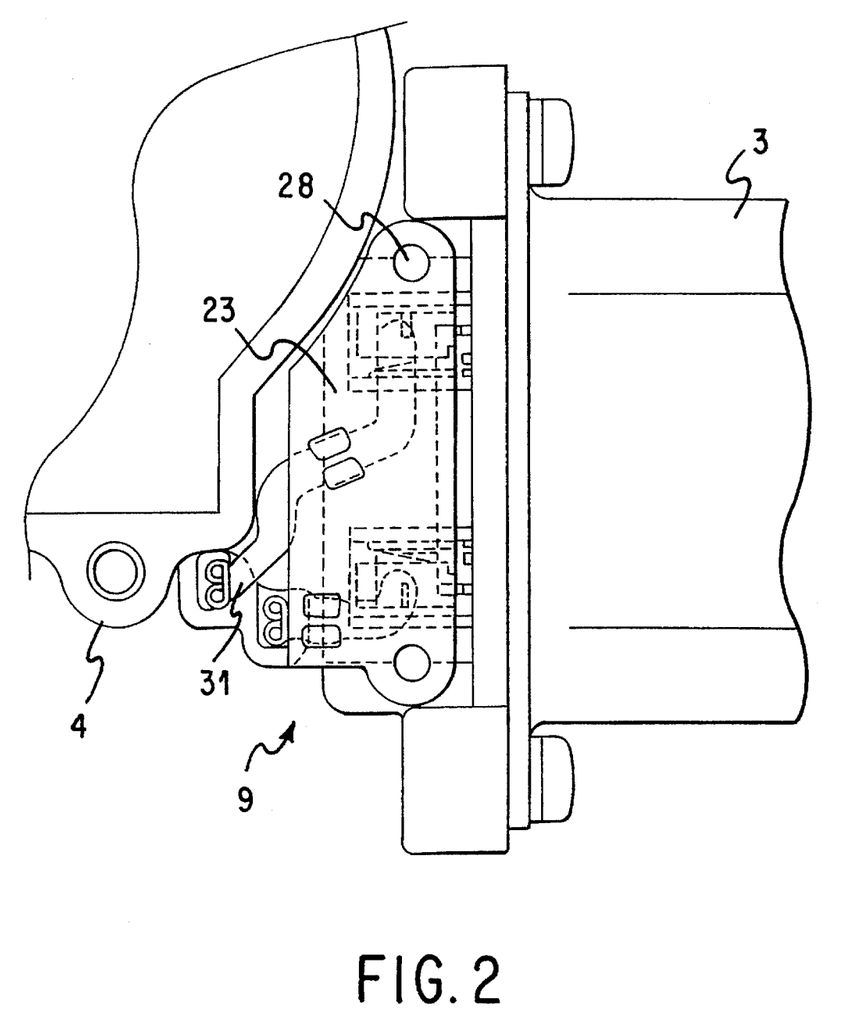
FIG. 2 is a plan view of a holder stay unit.
Figure 6:
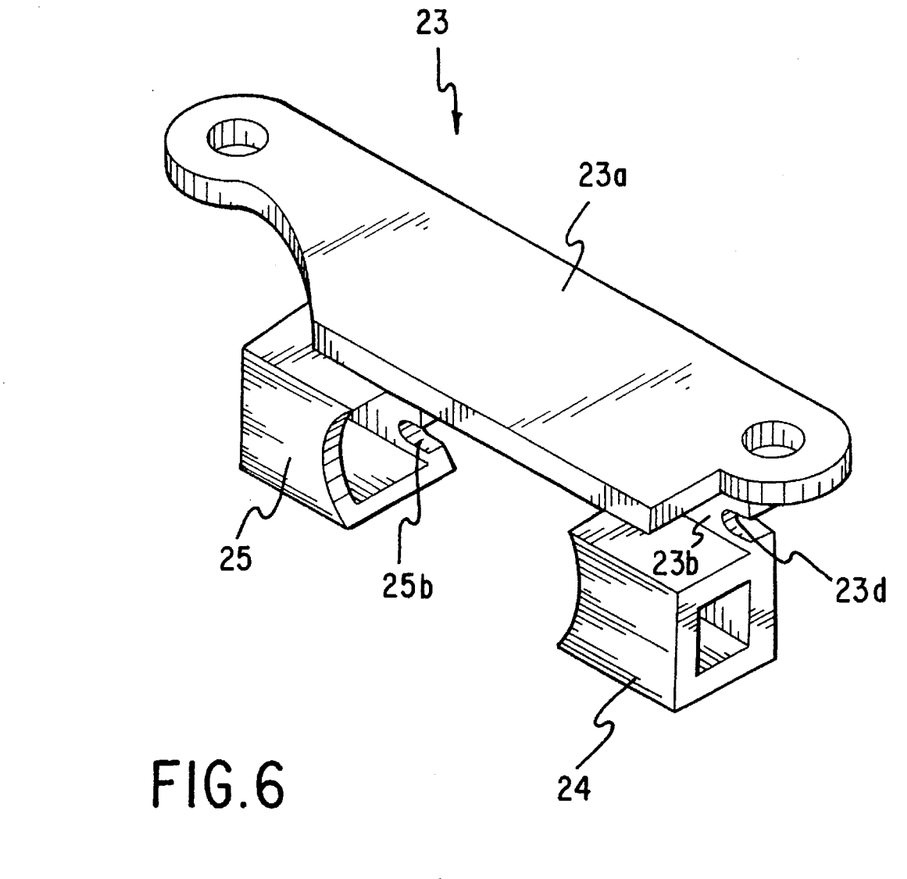
FIG. 6 is a perspective view of a brush holder.

FIG. 6 shows fret grooves 23d, 23e, 24b and 25b in the leg portions 23b, 23c and the brush accommodation units 24, 25 are provided for a pig tail 30. As seen in FIG. 2, for example, an extreme end of the fretted pig tail 30 is connected to an external connection terminal 31. Also shown in FIG. 6 are grooves 24c, 25c for inserting the other ends 13b, 14b of the springs.

In accordance with an embodiment of the invention discussed above, when the brushes 26, 27 are to be assembled to the motor 1, the brush springs 13, 14 are assembled to the cylindrical bottom portion 9b of the holder stay unit 9, which is preformed to the casing 2. The armature assembly is assembled to the holder stay unit 9, as discussed above. Then, in this state, the leg portions 23b, 23c of the brush holder 23, which is arranged as a unit and has the brushes 26, 27 accommodated in the brush accommodation units of the brush holder 23, are inserted, as discussed above, into to the passing-through holes 20, 21 of the holder stay unit 9. In accordance with this embodiment of the invention, since the brush unit is formed by assembling the brushes 26, 27 to the brush accommodation units 24, 25 of the brush holder 23, the brushes 26, 27 can be stably held by the brush accommodation units 24, 25. Therefore, since it is not necessary to provide a brush unit for each brush, the number of parts can be reduced, and further the number of processes for an assembly job can be also reduced.

In an embodiment of the invention discussed above, the brush springs 13, 14 are not assembled to the brush holder 23 but are assembled to the holder stay unit 9. The brushes 26, 27 are elastically depressed at the moment when the brushes 26, 27 substantially reach the diametrically opposed side positions of the commutator 10 based on the insertion and the assembly of the brush holder 23 to the holder stay unit 9 in accordance with the invention. As a result, when the brush holder 23 is being assembled to the holder stay unit, the brushes do not significantly project from the brush unit as is the case in the related art where the brush springs are assembled to the brush holder. Accordingly, in accordance with the invention, the brushes 26, 27 are prevented from being in contact with other parts, and thus it is not necessary that the brushes 26, 27 be temporarily held by the brush holder 23 to prevent hitting contact.

Further, in accordance with the embodiment of the invention discussed above, when the brush holder 23 is to be assembled to the holder stay unit 9, the brushes 26, 27 are first inserted into the passing-through holes 20, 21 by being guided by the taper-shaped potions 20a, 21a of the passing-through holes 20, 21 and then inserted by being guided by the guide surfaces 22a, 22b of the guide member 22 until the free ends of the brush holder 23 with the brushes 26, 27 come into contact with the commutator 10. Then the brushes 26, 27 are guided by the commentator until the brushes 26, 27 reach the diametrical side positions of the commutator. In accordance with the invention, the brushes can be easily guided to a proper position. Furthermore, when the brush holder 23 is assembled to the holder stay unit, it is substantially only the brushes 26, 27 that come into contact with the commutator 10. The ends 13b, 14b of the brush springs 13, 14 are not in sliding or any contact with the commutator as in related art. As a result, the possibility of the surface of the commutator being scratched by the ends 13b, 14b of the brush springs 13, 14 is eliminated.

Furthermore, since the brush springs 13, 14 used in accordance with an embodiment of the invention are of the twisted coil type, the problem of vibration being produced by the rotation of the commutator and the vibration being transmitted to the brush spring through the brushes and the production of noise is prevented. In contrast, in related art, when a leaf spring is used, noise is produced by the vibration of the leaf spring.

Further, since the brush holder 23 is assembled to the holder stay unit 9 by way of the outer periphery on the upper side of the cylindrical portion 9a of the holder stay unit, the brush holder 23 and the speed reduction mechanism can be assembled from the same direction. In accordance with the above described embodiment of the invention, the speed reduction mechanism including, for example, a worm wheel is assembled from the upper side of the end case 4, accordingly, an automatic assembly line assembling the motor 1 is significantly simplified.

For example, in accordance with an embodiment of the invention as discussed above, when the brushes are to be assembled to the motor, the leg portions of the brush holder having the brushes assembled thereto and arranged as a unit are inserted through the passing-through holes and assembled to the holder stay unit, to which the armature assembly is preassembled. Since the brush unit is formed by assembling the brushes to the brush accommodation units formed to the brush holder, the brushes can be stably held by the brush accommodation units. Further, since both brushes can be assembled to a single brush holder, a brush holder need not be formed for each individual brush. Thus, not only the number of parts can be reduced but also the number of processes for an assembly job also can be reduced.

In addition, in accordance with an embodiment of the invention, the brush springs for elastically depressing the brushes are assembled to the holder stay unit, and the brushes are elastically depressed when the brushes substantially reach the diametrically opposed side positions of the commutator based on the insertion of the brush holder and the assembly of the brush holder to the holder stay unit. As a result, when the brush holder is being assembled to the holder stay unit, the brushes do not significantly project from the brush holder as in the related art where the brush springs are preassembled to the brush holder. Accordingly, in accordance with the invention, the brushes are prevented from being in hitting contact with other parts during assembly. Further, it is not necessary to temporarily hold the brushes to prevent the brushes from projecting from the brush holder.

Furthermore, when the brush holder is assembled to the holder stay unit, it is substantially only the brushes that come into contact with the commutator. In contrast, in related art, a guide receiving portion which is formed at an extreme end of a leaf spring is in sliding contact with the commutator. As a result, a possibility of the guide receiving portion scratching the surface of the commutator is presented.

While advantageous embodiments have been chose to illustrate the invention, it will be understood by those skilled in the art that various changes and modifications can be made therein without departing from the scope of the invention as defined in the appended claims.

What is claimed is:

1. A brush assembly structure for a motor, comprising:
   a holder stay unit having exterior and interior surfaces, a commutator assembly disposed on the holder stay unit, the commutator assembly defining a longitudinal axis, a transverse axis coplanar and perpendicular to the longitudinal axis and an orthogonal axis perpendicular to the longitudinal and transverse axes, the holder stay unit comprising:
   first and second pass-through holes disposed in the holder stay unit and extending in an orthogonal direction, the first and second pass-through holes being symmetrically disposed with respect to the orthogonal axis;
   first and second spring support portions projecting from the interior surface of the holder stay unit and being disposed symmetrically with respect to the orthogonal axis and in a transverse outward direction from the first and second pass-through holes such that each pass-through hole is between the commutator assembly and the spring support portion; and
   first and second brush springs having first and second end portions, wherein the first and second brush springs are supported by the first and second support portions and the brush springs are positioned such that first end portions of each of the brush springs extend in an unbiased position into the first and second pass-through holes, the second end portions being in a fixed position; and
   a brush holder comprising an integral unit having first and second leg portions, the leg portions having free ends with brush accommodation units, a brush movably accommodated in each of the brush accommodation units in one of a retracted and projected position, the brush holder being connected to the holder stay unit through the first and second pass-through holes, the first end portions of the brush springs being depressed by the free ends of the brush holder as the brush holder is inserted into the pass-through holes so that the first end portions elastically project into the brush accommodation units when the brush holder approaches the commutator assembly to move the brushes from the retracted position to the projected position for contact with the commutator assembly.

2. The brush assembly structure according to claim 1, further comprising:
   a recessed portion disposed on the orthogonal axis in an outer periphery of the holder stay unit, wherein the first and second pass-through holes are disposed in the recessed portion of the holder stay unit.

3. The brush assembly structure according to claim 2, further comprising a guide member for guiding insertion of the brush holder, the guide member being integral with the holder stay unit and extending on the orthogonal axis and terminating in a vicinity of the commutator, the guide member extending in a direction toward the commutator.

4. The brush assembly structure according to claim 1, further comprising:
   first and second locking portions on the interior surface of the holder stay unit and being disposed symmetrically with respect to the orthogonal axis, wherein the second end portions are fixed to the holder stay unit by being held between the locking portions and the inner surface.

5. The brush assembly according to claim 4, wherein the first and second locking portions are disposed closer to the transverse axis than the first and second spring support portions.

6. The brush assembly structure according to claim 1, wherein the first spring support portion has a longitudinal length different from a longitudinal length of the second spring support portion by a predetermined amount.

7. The brush assembly structure according to claim 1, wherein the brush holder is substantially C-shaped.

8. The brush assembly structure according to claim 1, wherein the brush accommodation unit is of a quadrangular-prism-shape.

9. The brush assembly structure according to claim 1, wherein the brush accommodation units have opposing open ends for allowing passage of the brushes.

10. The brush assembly structure according to claim 1, wherein the brush is connected to an external connection terminal by a fretted pigtail.

11. A brush assembly structure for a motor, comprising:
    a holder stay unit for connection to a commutator assembly, the holder stay unit comprising:
    first and second pass-through holes disposed in the holder stay unit;
    first and second brush springs positioned on the holder stay unit and having first and second end portions, the first end portions being biased toward the pass-through holes;
    a brush holder comprising an integral unit having first and second leg portions, the leg portions having free ends with brush accommodation units, a brush movably accommodated in each of the brush accommodation units in one of a retracted and projected position, the brush holder being connected to the holder stay unit through the first and second pass-through holes, the first end portions of the brush springs being depressed by the free ends of the brush holder as the brush holder is inserted into the pass-through holes so that the first end portions elastically project into the brush accommodation units when the brush holder approaches a commutator assembly to move the brushes from the retracted position to the projected position for contact with a commutator assembly.

* * * * *